(12) United States Patent
Rowell

(10) Patent No.: US 11,021,147 B2
(45) Date of Patent: Jun. 1, 2021

(54) VEHICLES AND METHODS FOR DETERMINING OBJECTS OF DRIVER FOCUS

(71) Applicant: Toyota Research Institute, Inc., Los Altos, CA (US)

(72) Inventor: Todd J. Rowell, Arlington, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 260 days.

(21) Appl. No.: 16/217,499

(22) Filed: Dec. 12, 2018

(65) Prior Publication Data

US 2020/0189572 A1 Jun. 18, 2020

(51) Int. Cl.
| B60W 30/00 | (2006.01) |
| B60W 30/09 | (2012.01) |
| B60W 10/18 | (2012.01) |
| G06K 9/00 | (2006.01) |
| G06F 3/16 | (2006.01) |

(Continued)

(52) U.S. Cl.
CPC ............ *B60W 30/09* (2013.01); *B60W 10/04* (2013.01); *B60W 10/18* (2013.01); *B60W 10/20* (2013.01); *B60W 40/08* (2013.01); *B60W 50/10* (2013.01); *G05D 1/0088* (2013.01); *G06F 3/165* (2013.01); *G06K 9/00604* (2013.01); *G06K 9/00805* (2013.01); *G10L 15/22* (2013.01); *B60W 2040/0818* (2013.01); *B60W 2420/42* (2013.01); *B60W 2420/52* (2013.01); *B60W 2420/54* (2013.01); *B60W 2540/21* (2020.02); *B60W 2554/00* (2020.02); *B60W 2710/18* (2013.01);

(Continued)

(58) Field of Classification Search
CPC ...... B60W 30/00; B60W 10/00; B60W 10/04; B60W 10/18; B60W 10/20; B60W 40/00; B60W 40/08; B60W 50/00; B60W 50/10; B60W 2554/00; B60W 2540/21; B60W 2040/0818; B60W 2420/42; B60W 2040/52; B60W 2040/54; B60W 2710/18; B60W 2710/20; B60W 2720/106; G05D 1/00; G05D 1/0088; G06F 3/00; G06F 3/165; G06K 9/00; G06K 9/00604; G06K 9/00805; G10L 15/00; G10L 15/22; G01C 21/20; G01C 21/24; G01C 21/34
See application file for complete search history.

(56) References Cited

U.S. PATENT DOCUMENTS

| 5,694,116 A | 12/1997 | Kojima |
| 6,366,207 B1 * | 4/2002 | Murphy ................. G08B 21/06 |
| | | 340/576 |

(Continued)

*Primary Examiner* — Yonel Beaulieu
(74) *Attorney, Agent, or Firm* — Dinsmore & Shohl LLP

(57) ABSTRACT

Vehicles and methods for determining an object of a driver's focus are disclosed. In one embodiment, a vehicle includes an object detection sensor configured to output an output signal, a sound detection sensor configure to output a sound signal, and an electronic control unit. The electronic control unit is configured to detect one or more objects based at least in part on the output signal of the object detection sensor, and detect speech based on the sound signal of the sound detection sensor. The electronic control unit is further configured to determine an object of focus based at least in part on a comparison of the speech and the one or more objects, and produce a control signal based at least in part on the object of focus.

20 Claims, 4 Drawing Sheets

(51) Int. Cl.
    *G05D 1/00* (2006.01)
    *B60W 50/10* (2012.01)
    *B60W 10/04* (2006.01)
    *B60W 40/08* (2012.01)
    *G10L 15/22* (2006.01)
    *G10L 15/00* (2013.01)
    *G10L 15/08* (2006.01)
    *B60W 10/20* (2006.01)

(52) U.S. Cl.
    CPC ... *B60W 2710/20* (2013.01); *B60W 2720/106* (2013.01)

(56) References Cited

U.S. PATENT DOCUMENTS

| | | | |
|---|---|---|---|
| 8,140,344 B2* | 3/2012 | Kameyama | B60H 1/00742 |
| | | | 705/1.1 |
| 9,007,198 B2 | 4/2015 | Gunaratne | |
| 9,020,823 B2 | 4/2015 | Hoepken et al. | |
| 9,165,280 B2 | 10/2015 | Basson et al. | |
| 9,235,987 B2* | 1/2016 | Green | G08B 21/02 |
| 9,365,213 B2 | 6/2016 | Stenneth et al. | |
| 9,527,442 B2 | 12/2016 | Iwai | |
| 9,576,492 B2* | 2/2017 | Rosen | B60T 7/22 |
| 9,628,565 B2* | 4/2017 | Stenneth | B60W 30/09 |
| 9,682,711 B2 | 6/2017 | Lee | |
| 10,202,127 B2* | 2/2019 | Shiraishi | H04L 67/12 |
| 10,334,049 B2* | 6/2019 | Stenneth | B60W 30/09 |
| 10,372,130 B1* | 8/2019 | Kaushansky | B60W 60/001 |
| 10,471,969 B1* | 11/2019 | Laserra Lima | B60W 60/0059 |
| 10,482,904 B1* | 11/2019 | Hardie | G10L 25/87 |
| 2011/0083075 A1* | 4/2011 | MacNeille | G10L 15/22 |
| | | | 715/728 |
| 2014/0303807 A1* | 10/2014 | Addepalli | H04W 48/18 |
| | | | 701/1 |
| 2016/0216130 A1* | 7/2016 | Abramson | G01C 21/3423 |
| 2017/0015318 A1 | 1/2017 | Scofield et al. | |
| 2017/0090475 A1 | 3/2017 | Choi et al. | |
| 2017/0154528 A1 | 6/2017 | Moritani et al. | |
| 2018/0328750 A1* | 11/2018 | Yun | B62D 15/0285 |
| 2019/0001987 A1* | 1/2019 | Kim | B60W 40/10 |
| 2019/0163186 A1* | 5/2019 | Yoon | G05D 1/0223 |

* cited by examiner

VEHICLES AND METHODS FOR DETERMINING OBJECTS OF DRIVER FOCUS

TECHNICAL FIELD

The present specification generally relates to vehicles and, more specifically, vehicles capable of determining objects of driver focus and methods thereof.

BACKGROUND

Drivers of vehicles, such as automobiles, may focus on particular objects in the environment. For example, a driver may focus on a billboard sign, another vehicle driving in close proximity, or pedestrians in proximity to the vehicle. In some cases, objects of a driver's focus may be distracting and may cause the driver of the vehicle to not pay attention to other objects or situations in the environment that may pose more risk than the object of the driver's focus. For example, the driver may be focused on another vehicle and may be unaware of a pedestrian that is about to enter the street.

SUMMARY

In one embodiment, a vehicle includes an object detection sensor configured to output an output signal, a sound detection sensor configure to output a sound signal, and an electronic control unit. The electronic control unit is configured to detect one or more objects based at least in part on the output signal of the object detection sensor, and detect speech based on the sound signal of the sound detection sensor. The electronic control unit is further configured to determine an object of focus based at least in part on a comparison of the speech and the one or more objects, and produce a control signal based at least in part on the object of focus.

In another embodiment, a vehicle includes an object detection sensor configured to output an output signal, a sound detection sensor configure to output a sound signal, a gaze detection sensor configured to output a gaze signal, an audio system configured to produce an audio signal, and an electronic control unit. The electronic control unit is configured to detect one or more objects based at least in part on the output signal of the object detection sensor, and control the audio system such that the audio signal prompts a driver to speak. The electronic control unit is further configured to detect speech based on the sound signal of the sound detection sensor, detect a gaze direction based on the gaze signal of the gaze detection sensor, determine an object of focus based at least in part on a comparison of the speech and the one or more objects and on the gaze direction, and produce a control signal based at least in part on the object of focus.

In yet another embodiment, a method includes detecting, using an object detection sensor, one or more objects surrounding a vehicle, detecting speech using a sound detection sensor, and determining, by an electronic control unit, an object of focus by comparing one or more words of the speech to one or more attributes of the one or more objects. The method further includes producing, by the electronic control unit, a control signal for the vehicle based at least in part on the object of focus.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein are directed to methods and vehicles configured to detect one or more objects of driver focus, and then take appropriate action accordingly. Actions may include, but are not limited to, providing an auditory or visual warning to the driver of the vehicle, or taking autonomous control of the vehicle to avoid objects in the environment. In some embodiments, the vehicle determines an object of driver focus by receiving the speech of the driver, comparing the speech to objects in the environment detected by the vehicle, and selecting an object as the object of focus when words of the speech correspond to attributes of a particular object in the environment. Thus, by monitoring the speech of a driver, the vehicle may understand a perception of the driver (i.e., what the driver is focused on). Understanding the perception of the driver may enable the vehicle to more quickly issue warnings or take control of the vehicle to avoid potential issues before they happen. As an example and not a limitation, knowledge of a driver's perception may enable a vehicle to take action quicker than without knowledge of the driver's perception. As described in more detail below, additional information may be used in addition to the speech of the driver to determine a driver's perception.

Various embodiments of methods and vehicles configured to detect one or more objects of driver focus are described and illustrated hereinbelow.

Figure 1:
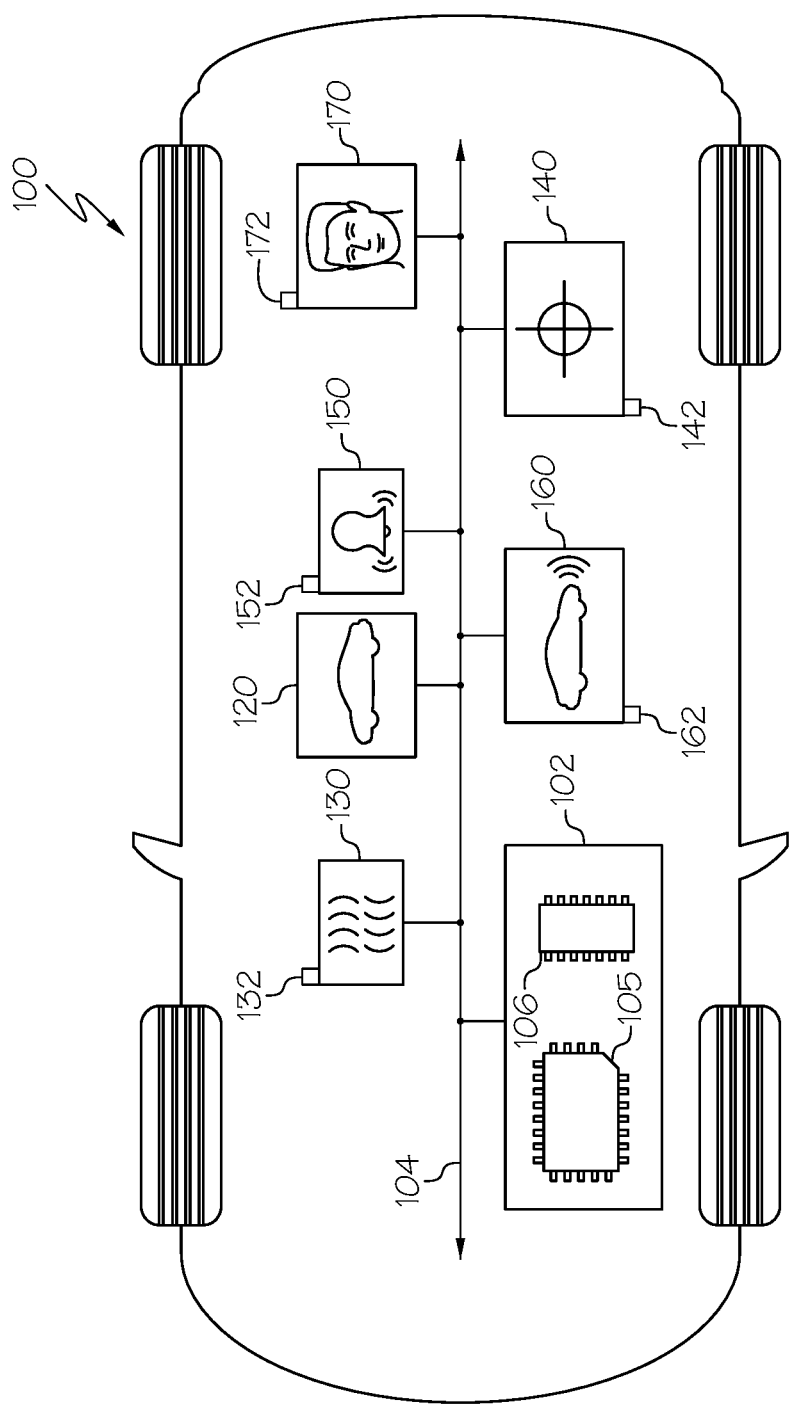
FIG. 1 depicts a schematic view of an example vehicle configured to determine an object of focus of a driver, according to one or more embodiments shown and described herein.

Referring now to FIG. 1, an embodiment of a vehicle 100 is schematically depicted. The vehicle 100 may be any passenger vehicle such as, for example, a terrestrial, aquatic, and/or airborne vehicle. The vehicle 100 includes a communication path 104, an electronic control unit 102, an object detection system 130, an autonomous control system 120, a notification system 150, a driver detection system 170, a location determination system 140, and a vehicle operating condition sensor system 160. The electronic control unit 102 includes one or more processors 105 and one or more memory modules 106. The electronic control unit 102 is configured to determine an object of driver focus (i.e., an "object of focus") based on signals provided by the driver detection system 170, and issue one or more notifications using the notification system 150 or take autonomous control of the vehicle 100 using the autonomous control system 120 based on the object of focus and objects in the environment as determined by the object detection system 130.

The communication path 104 provides data interconnectivity between various modules disposed within the vehicle 100. Specifically, each of the modules can operate as a node that may send and/or receive data. In some embodiments, the communication path 104 includes a conductive material that permits the transmission of electrical data signals to processors, memories, sensors, and actuators throughout the vehicle 100. In some embodiments, the communication path 104 can be a bus, such as, for example, a LIN bus, a CAN bus, a VAN bus, and the like. In some embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 1, the electronic control unit 102 can be any computing device. For instance the electronic control unit 102 can be any type of vehicle-installed, handheld, desktop, or other form of single computing device, or can be composed of multiple computing devices. The electronic control unit 102 includes one or more processors 105 for controlling operations of the electronic control unit 102. The one or more processors 105 may include any device capable of executing machine-readable instructions stored on a non-transitory computer-readable medium. Accordingly, each of the one or more processors 105 may include a controller, an integrated circuit, a microchip, a computer, and/or any other computing device.

The electronic control unit 102 further includes one or more memory modules 106 communicatively coupled to the one or more processors 105. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the electronic control unit 102 and/or external to the electronic control unit 102. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 106 may include, for example, object recognition logic, speech recognition logic, risk determination logic, notification generation logic, and autonomous vehicle control logic. Thus, the electronic control unit includes logic to receive signals from the driver detection system 170 to determine the speech of the driver, receive signals from the object detection system 130 to detect objects in the environment, determine one or more objects of focus, and issue a notification using the notification system 150 and/or autonomously control the vehicle 100 using the autonomous control system 120.

As noted above, the logic stored on the one or more memory modules 106 may include object recognition logic. The object recognition logic may include any known or yet-to-be-developed object recognition algorithms that may be utilized to detect objects within an environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like. The logic stored on the electronic control unit may also include speech recognition logic used to detect the words spoken by the driver and/or passengers within the vehicle 100. Any known or yet-to-be-developed speech recognition algorithms may be used for the speech recognition logic.

In the embodiments described herein, the one or more memory modules 106 and the one or more processors 105 are integral with the electronic control unit 102. However, it is noted that the electronic control unit 102, the one or more memory modules 106, and the one or more processors 105 may be discrete components communicatively coupled to one another without departing from the scope of the present disclosure. As an example and not a limitation, one or more processors and one or more memory modules 106 of the electronic control unit 102 may be remote to the vehicle 100. For example, the vehicle 100 may be in wireless communication (e.g., using a wireless communication system) with a remote server storing logic and data that is configured to perform at least some of the functionalities described herein.

The object detection system 130 is communicatively coupled to the electronic control unit 102 over the communication path 104. The object detection system 130 may include any device configured to detect the presence of an object within the vicinity of the vehicle 100. As such, the object detection system 130 may include an object detection sensor 132. The object detection sensor 132 may be configured to output an output signal indicative of the presence of one or more objects within a vicinity of the vehicle 100. Based on the output signal of the object detection sensor 132, the electronic control unit 102 may execute object recognition logic to detect an object and classify the detected object into a classification. The object detection sensor 132 may include, but is not limited to, a camera, a LiDAR sensor, a RADAR sensor, a sonar sensor, a proximity sensor, and the like. In some embodiments, the object detection system 130 includes more than one object detection sensor 132.

The autonomous control system 120 is communicatively coupled to the electronic control unit 102 over the communication path. The autonomous control system 120 is configured to produce control signals to various vehicle hardware systems to perform autonomous control of one or more vehicle functions. As non-limiting examples, the autonomous control system 120 is configured to send control signals to a braking system, a steering system, and a throttle system of the vehicle to autonomously control the vehicle 100 as appropriate. As described in more detail below, one or more of the control signals of the autonomous control system 120 may be based on one or more objects of driver focus.

The location determination system 140 is communicatively coupled to the electronic control unit 102 over the communication path 104. The location determination system 140 may include any device configured to determine a location of the vehicle 100. For example, the location determination system 140 may determine that the vehicle 100 is on a highway, in a city, in a rural area, etc. As such, the location determination system 140 may include a location sensor 142 configured to output an output signal indicative of the location of the vehicle 100. Based on the output signal of the location determination system 140, the electronic control unit 102 may execute logic to determine a vehicle location. The location sensor 142 may include, but is not limited to, a camera, a GPS unit, and the like. In embodiments where the location sensor 142 includes a camera, the electronic control unit 102 may execute object recognition logic to determine based on objects within the environment of the vehicle 100, the location of the vehicle 100. For example, the one or more processors 105 of the electronic control unit 102 may execute object recognition logic, such that the electronic control unit 102 may read signs and/or recognize objects that may indicate a location of the vehicle 100 (e.g., on ramps, highways, sidewalks, storefronts, houses, and the like).

The vehicle operating condition sensor system 160 is communicatively coupled to the electronic control unit 102 over the communication path 104. The vehicle operating condition sensor system 160 may include any device configured to detect an operating condition of the vehicle 100. For example, the vehicle operating condition sensor system 160 may detect vehicle speed, acceleration, braking, and the like. As such, the vehicle operating condition sensor system 160 may include an operation condition sensor 162 configured to output an output signal indicative of the operation of the vehicle 100. The operation condition sensor 162 may include, but is not limited to, a speed sensor, an acceleration sensor, a braking sensor, and the like. In some embodiments, the operation condition sensor 162 may be a GPS unit, wherein a speed of the vehicle 100 is determined from an output of the GPS unit. The output of the vehicle operating condition sensor system 160 may be used as an input by the autonomous control system 120 to autonomously control the vehicle 100, for example.

The driver detection system 170 is communicatively coupled to the electronic control unit 102 over the communication path 104. The driver detection system 170 may include any device configured to detect the presence, movements and/or actions of the driver of the vehicle 100. As such, the driver detection system 170 may include one or more driver detection sensors 172. In one example, the driver detection sensor 172 is a sound detection sensor operable to detect sounds within the vehicle 100, and produce a sound signal corresponding with the detected sounds. An example sound detection sensor is a microphone capable of receiving the speech of the driver and producing a corresponding sound signal for use by the electronic control unit 102 to perform the functionalities described herein. The one or more driver detection sensors 172 may include other sensors. A gaze detection sensor may be provided within the vehicle 100 to monitor a gaze direction of the driver. As described in more detail below, the gaze direction of the driver may be used by the electronic control unit 102 to determine an object of focus. As an example and not a limitation, the gaze detection sensor may be a camera mounted within the vehicle 100 such that a driver's face is within a field of view of the camera. The one or more driver detection sensors 172 may also include a seat sensor operable to detect a driver's seating position and produce a corresponding driver position signal. As described in more detail below, a driver's seating position may be indicative of a state of mind of the driver and/or a focus of the driver.

The notification system 150 is communicatively coupled to the electronic control unit 102 over the communication path 104. The notification system 150 may include any notification device 152 configured to output a notification (e.g., an alert or warning) to either an occupant of the vehicle 100 or an object detected outside of the vehicle 100. The notification device 152 may include, but is not limited to, a vehicle horn, a vehicle light (e.g., turn signals, headlamps, emergency lights, tail lights, interior lights, etc.), a tactile feedback device, a vehicle speaker, and the like. As will be described in greater detail below, notifications may be based on objects of the driver's focus as determined by the electronic control unit 102.

Figure 2:
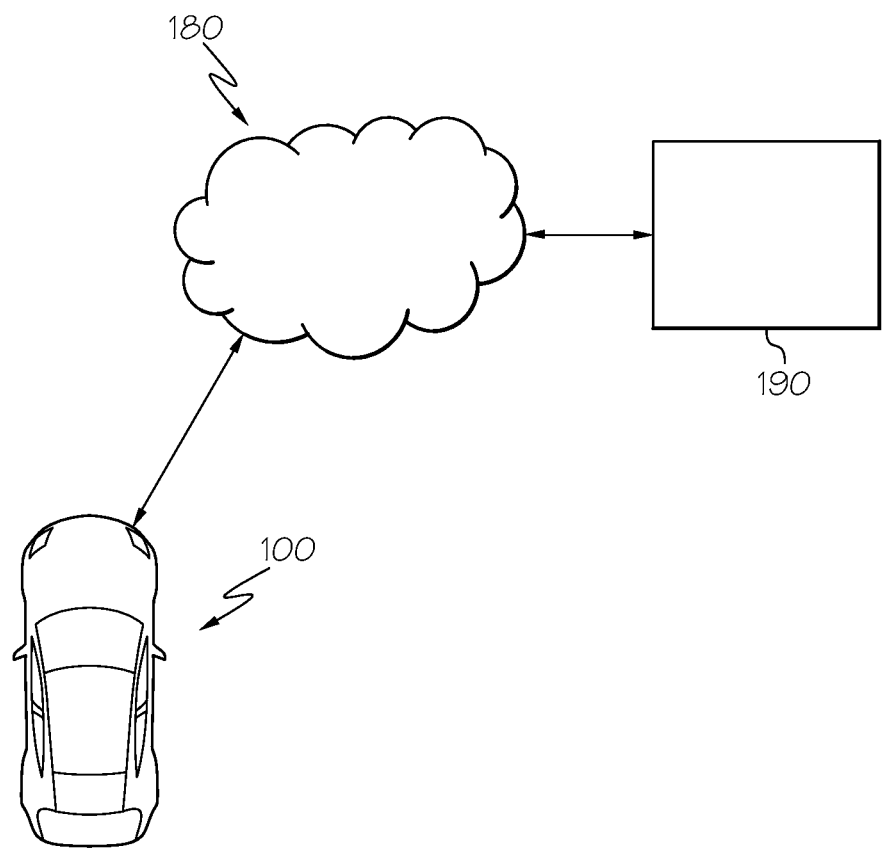
FIG. 2 depicts a schematic view of an example vehicle in wireless communication with a network and a remote server, according to one or more embodiments shown and described herein.

Referring now to FIG. 2, in some embodiments the vehicle 100 is in wireless communication with a remote server 190 via a network 180, such as the Internet. The example vehicle 100 may be equipped with means (not shown) for wirelessly communicating with the network 180 and the remote server 190. As an example and not a limitation, the vehicle 100 may be equipped with a cellular communications device to transmit data to and from the remote server 190. As another non-limiting example, the vehicle 100 may provide local wireless communication between the electronic control unit 102 and a mobile device (e.g., communication between the electronic control unit 102 and a smartphone by a wireless protocol such at Bluetooth) such that the mobile device communicates with the network 180 and the remote server 190. As stated above, the remote server 190 may include one or more processors and one or more memory modules capable of performing at least some of the functionalities described herein. As an example and not a limitation, the remote server 190 may perform one or more of the object recognition functionality and the speech recognition functionality described herein. The vehicle 100 may send data of the output signal of the object detection sensor 132 and the sound signal of the driver detection sensor 172 to the remote server 190. The remote server 190 may perform object recognition and speech recognition processes, which may use significant processing resources. The results of the object recognition and speech recognition processes may then be sent by the remote server 190 to the vehicle 100. It should be understood that, in other embodiments, all of the processing is performed locally within the vehicle 100.

Figure 3:
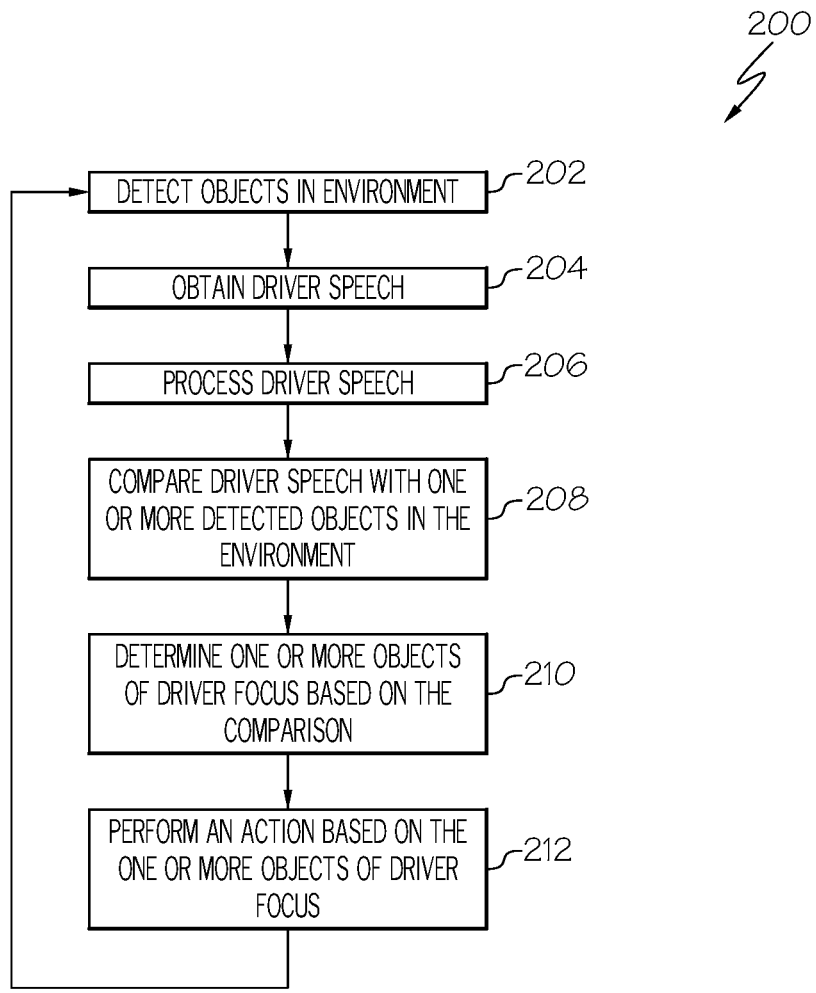
FIG. 3 depicts a flowchart of an example method for determining an object of focus of a driver, according to one or more embodiments shown and described herein.

Referring now to FIG. 3, a flowchart 200 depicting a method for producing control signals based at least in part on an object of a driver's focus is graphically depicted. As described in more detail below, the control signals may produce a notification for the driver (e.g. an audio notification, a video notification, and/or a haptic notification) or may control various vehicle hardware systems to autonomously control the vehicle depending on the risk level. It should be understood that embodiments are not limited by the order of steps of the flowchart 200 of FIG. 3.

The electronic control unit 102 may detect an object or objects within a vicinity of the vehicle 100 based on the output signal output by the object detection sensor 132 (block 202). As noted above, the object detection sensor 132 is configured to output an output signal indicative of the presence of an object within the vicinity of the vehicle 100. Using object recognition logic stored on the one or more memory modules 106 (and/or a remote server 190), the electronic control unit 102 may classify the detected objects. For example, the electronic control unit 102 may classify various objects detected within the vicinity of the vehicle 100 as pedestrians, bicycles, animals, houses, vehicles, skateboards, children's toys, and the like. For example, the electronic control unit 102 may use various object recognition algorithms to detect and classify the various objects found within the environment. Such object recognition algorithms include, for example, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like. The detected objects may allow the electronic control unit 102 to determine an environment (e.g., residential/commercial) depending on the classifications of objects detected within the environment, for example.

Additionally, in some embodiments, a location of the vehicle 100 is also determined using the location sensor 142 to determine objects within the environment. As an example and not a limitation, static objects such as stores, lampposts, signs, crosswalks, and other objects may be determined from map data and the location of the vehicle 100.

Figure 4:
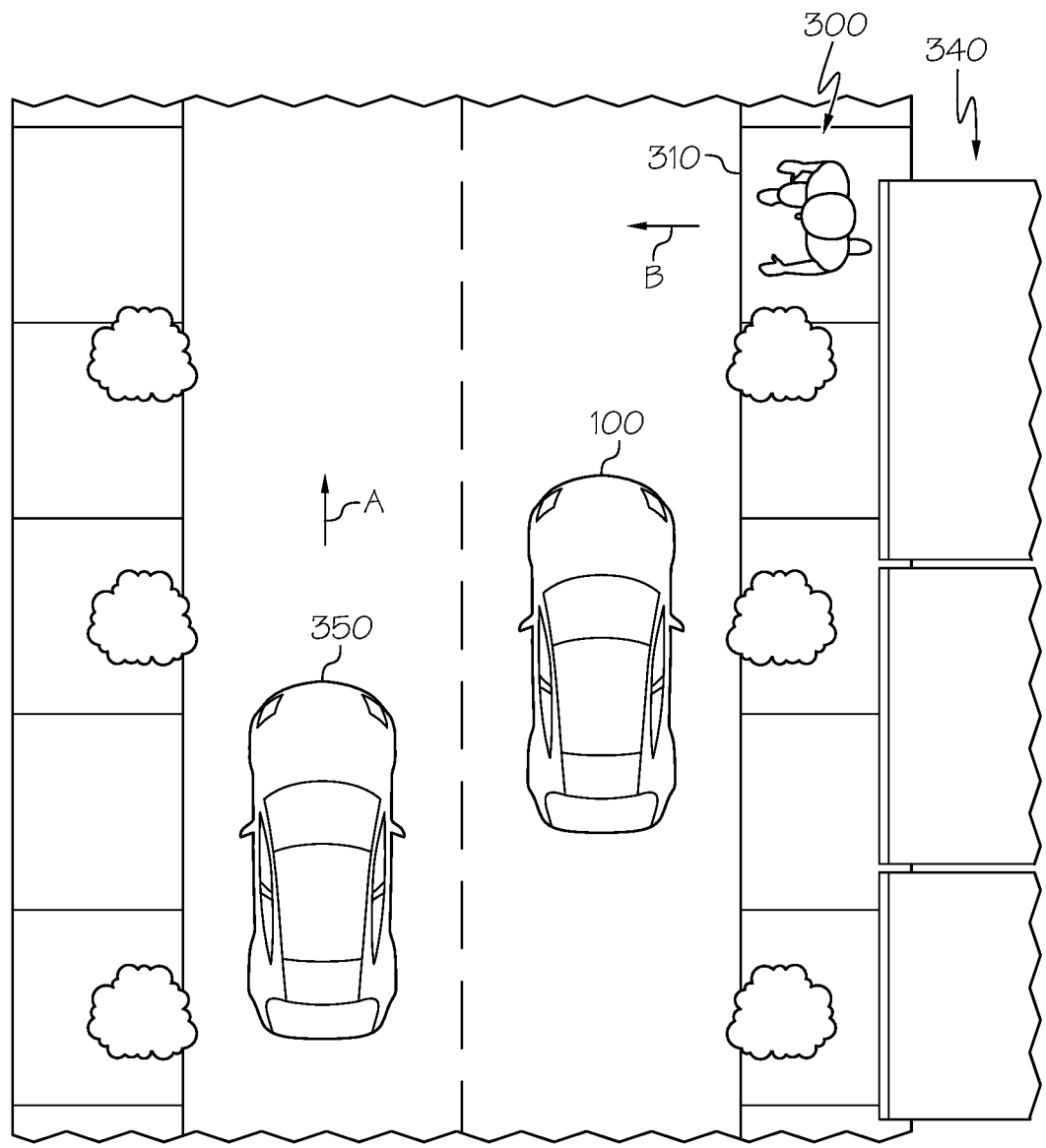
FIG. 4 depicts a schematic illustration of an example vehicle within an environment, according to one or more embodiments shown and described herein.

As a non-limiting example, FIG. 4 illustrates the vehicle 100 in a city environment. The object detection sensor 132 may include a camera (or other types of sensors) that may allow the electronic control unit 102 to detect an object within the vicinity of the vehicle 100 and perform object recognition on the detected object to determine a location and type of the object. In the case of FIG. 4, the electronic control unit 102 may perform object recognition to recognize the type and location of objects (e.g., other vehicles 350, a pedestrian walkway 310, storefronts 340, people, and the like).

In FIG. 4, a vehicle 100 is illustrated with a person 300 walking on a pedestrian walkway 310 in front of the vehicle 100. Another vehicle 350 is traveling in the left lane in the same direction as the vehicle 100. The electronic control unit 102, based on the output signal of the object detection sensor 132, may detect vehicle 350, the person 300 and/or the pedestrian walkway 310 within the vicinity of the vehicle 100. The electronic control unit 102 may execute object recognition logic to classify the objects. In this case, the electronic control unit 102 may classify the person 300 as a person classification and vehicle 350 as a vehicle. In some embodiments, the electronic control unit 102 may also classify the pedestrian walkway 310 as a pedestrian walkway classification (or the like). Thus, the vehicle 100 is configured to detect the type and location of objects within the environment.

Further, in some embodiments, the electronic control unit 102 is configured to predict a trajectory of objects within the environment. For example, the electronic control unit 102 may determine that vehicle 350 is traveling in direction A at a particular speed, and may predict the location of vehicle 350 over the course of time. Similarly, the electronic control unit 102 may determine that person 300 is traveling in direction B at a particular speed, and may predict the location of person 300 over the course of time. As described in more detail below, objects in the environment may present risks to the vehicle. Actions such as notifications and autonomous control of the vehicle may be performed based on risk levels associated with the vehicle as well as the perception of the driver.

Next, referring once again to FIG. 3, driver speech is obtained using the one or more driver detection sensors 172 at block 204. As noted above, the one or more driver detection sensors 172 may include a microphone capable of detecting sounds within the vehicle 100. The sounds may include speech spoken by the driver. A sound single from the microphone is provided to the electronic control unit 102. Speech recognition logic executed by the electronic control unit 102 (and/or a remote server 190) processes and detects the words spoken by the driver (block 206). The electronic control unit 102 may be configured to distinguish between the driver's voice and other voices spoken within the vehicle 100. For example, the electronic control unit 102 may be trained to recognize the driver's voice using a calibration process wherein the driver speaks passages to the vehicle 100. The driver's speech may then be stored in a driver profile within the one or more memory modules 106 of the electronic control unit 102.

The words spoken by the driver of the vehicle 100 may provide information regarding a driver's current perception. In many cases, drivers will talk to themselves about what is occurring in the environment of the vehicle. Thus, by monitoring the speech of the driver, the electronic control unit 102 may have a better understanding of what the driver is focused on. The electronic control unit 102 may then proactively provide control signals to the vehicle based on the driver's focus.

Referring once again to the example of FIG. 4, the electronic control unit 102 detects that a vehicle 350 is traveling in direction A and attempting to pass vehicle 100 in the left lane. The electronic control unit 102 also detects a person 300 in a pedestrian walkway 310 traveling in direction B. The driver of the vehicle 100 may be focused on vehicle 350 in the left lane. For example, the driver may say "What is this car doing?!" with respect to vehicle 350. This sentence spoken by the driver is indicative that vehicle 350 is the object of the driver's focus. The electronic control unit 102 is configured to receive a sound signal including the words spoken by the driver, and then parse out the words of the sentence.

Referring once again to FIG. 3, the speech of the driver is compared against the detected objects in the environment (block 208). For example, individual words spoken by the driver are compared against attributes of the detected objects. Words spoken by the driver that match attributes of the detected objects are used to determine one or more objects of focus (block 210). Attributes of objects are not limited by this disclosure. Attributes may include, but are not limited to, object classification (e.g., vehicle, person, sign, building, bicycle, motorcycle, etc.) and other descriptors of objects (e.g., color, size, shape, sex, clothing, and the like). Thus, when a driver says, "Look at that guy in the red suit!", the electronic control unit 102 may compare the words "guy" and "red" against the detected objects, and select the person wearing red as the object of focus. In the example of FIG. 4, the electronic control unit 102 may compare the word "car" spoken by the driver against the objects detected in the environment. The electronic control unit 102 classified vehicle 350 as "car." Thus, based on the comparison of the speech with the detected objects, the electronic control unit 102 may determine that the driver is focused on vehicle 350.

At block 212 of the flowchart 200 of FIG. 3, an action is taken based at least in part on the detect object of focus. The action may be based on the object of focus and a risk level encountered by the vehicle. The methods of determining the risk level encountered by the vehicle are not limited by this disclosure.

As an example and not a limitation, the electronic control unit 102 may use data from the vehicle operating condition sensor system 160 to create a trajectory of the vehicle 100. Furthermore, the electronic control unit 102 may monitor the location and movement of the detected objects in the environment. Detected objects may have a risk level associated therewith. The risk level may be based on a likelihood that the vehicle 100 will contact a detected object in the environment, be driven off of the road, or other undesirable circumstances. Actions may be taken when the risk level is above one or more risk thresholds. As a non-limiting example, there may be a risk threshold for a notification and a second, higher risk threshold for autonomous control of the vehicle 100.

In some cases, the action that is taken is no action at all, such as when the risk level is low and below any risk threshold. In other cases, where there is a possibility that the vehicle 100 will contact a selected object (or other undesirable circumstance) such that the risk level is above a first threshold, the action may be providing a control signal to the notification system 150 (or audio system) to produce a warning. It is noted that detected objects having a risk level above a risk threshold are referred to herein as selected objects. In other cases, where there is a strong likelihood that the vehicle 100 will contact a selected object (or other undesirable circumstance) and the risk level is greater than a second, higher risk threshold, the action may be providing a control signal to the autonomous control system 120 to autonomously control the vehicle 100 such that the vehicle avoids the detected object or other undesirable circumstance.

Understanding the object of the driver's focus may increase the effectiveness of the actions taken by the electronic control unit 102. For example, no action may be taken in the case where there is a possibility of the vehicle 100 contacting a selected object but the object of focus matches the selected object. As another example, when the object of focus does not match a selected object having a risk level above one or more risk thresholds, an action such as a notification or autonomous control of the vehicle 100 may be taken. It is noted that actions may be taken by the electronic control unit 102 even in cases where the object of focus matches the selected object depending on the risk level associated with the selected object.

Referring once again to the example of FIG. 4, vehicle 350 is determined to be the object of focus based on the driver's speech. The electronic control unit 102 may detect that a person 300 is about to enter the street in direction B, and may determine that there is some risk that the vehicle 100 may contact the person 300. Thus, the person 300 may be selected as a selected object having a risk level above a risk threshold. As an example and not a limitation, the risk level associated with the person 300 may be above a first risk level associated with a notification action. Because the vehicle 350 is the object of focus of the driver, the electronic control unit 102 may generate a control signal to produce a notification, such as an auditory warning by the notification system 150 or an audio system. Other notifications may include visual and haptic warnings. If the risk level is above a second risk threshold associated with autonomous control of the vehicle 100, the control signal may be provided to the autonomous control system 120 to autonomously control the vehicle 100 to avoid the person 300. Therefore, embodiments described herein avoid unnecessary warnings when the object of focus matches a detected object having elevated risk associated therewith, and also provides advanced warnings and/or vehicular control over systems that do not account for a driver's perception.

It is noted that other aspects of the driver's speech beyond words may be considered by the electronic control unit 102. For example, intonation, volume and speed of a driver's voice, as well as words chosen, may provide information regarding the driver's mood and therefore his or her perception. Fast speech with a certain intonation may be indicative of intense focus, for example. Additionally, certain words and yelling may also be indicative of an agitated mood. Intense focus and mood may be factors in considering a driver's perception. In some embodiments, experimental data is collected for many drivers over time. Machine learning is used to recognize patterns in the speech that correlate to driver perception. These patterns may be used by the electronic control unit 102 when determining an object of focus and/or determining what type of action to take. Additionally, machine learning may be used to find patterns for specific drivers. The electronic control unit 102 may be programmed to learn the tendencies of the driver of the vehicle 100. These tendencies may be stored in a driver profile, which may be stored in the one or more memory modules 106 of the electronic control unit 102. The driver profile may be accessed by the electronic control unit 102 when determining the object of focus. Thus, the tendencies of the driver are considered to improve the accuracy in determining the object of focus in some embodiments.

In some embodiments, the electronic control unit 102 produces an audio signal that is provided to the notification system 150 or an audio system (e.g., vehicle speakers). The audio signal includes instructions to the driver that prompts the driver to speak to the vehicle 100. The electronic control unit 102 may record the driver's speech for use in the driver profile. The audio signal may instruct the driver to describe objects in the environment. The audio signal may also encourage the driver to get into the habit of talking while driving. In this manner, more data regarding the driver's speech may be collected for use in a driver profile and for detecting objects of focus based on speech.

In some embodiments, additional information beyond driver speech is used to determine the object of focus of the driver. The one or more driver detection sensors 172 of the driver detection system 170 may include a gaze detection sensor, such as a camera with a field of view on a face of the driver. The gaze detection sensor is configured to output a gaze signal indicative of a gaze direction of the driver. For example, the gaze detection sensor may determine a pose of a driver's head, and a position of the driver's eyes. When an object in the environment is within a gaze direction of the driver, the object may be considered an object of focus. When the driver's speech describes the same object that is within the gaze direction of the driver, there is a strong possibility that the particular object is an object of focus. In some embodiments, a confidence level is associated with the object of focus. When the gaze direction and the driver's speech both indicate a particular object as an object of focus, the confidence level is higher than the case where only one of the driver's speech and the gaze direction indicate the particular object as the object of focus.

The one or more driver detection sensors 172 of the driver detection system 170 may include other types of sensors. As another example, the one or more driver detection sensors 172 may include a seat sensor configured to output a seat signal indicative of a driver seat position. A driver's position in his or her seat may be indicative of his or her mood and/or perception. As an example and not a limitation, a driver leaning forward at the edge of the seat may indicate that the driver is anxious, and extremely focused on driving. As another non-limiting example, a driver that is leaning far back in his or seat may indicate a very relaxed and calm driver. Machine learning may be applied to experimental data of many drivers to find correlations between driver seat position and driver perception. Additionally, machine learning may be applied to driver-specific data to find correlations between an individual driver's seat position and the individual driver's perceptions. Such correlations may be stored in the driver profile, for example. Thus, the driver seat position may be used in producing a control signal to take an action, such as produce a notification signal or autonomous control the vehicle 100.

Still yet other information may be used to determine the driver's perception and thus object of focus. For example, the audio system volume level of music or other audio programming played by the audio system of the vehicle 100 may be indicative of a focus of the driver. As an example and not a limitation, loud music may be indicative of a driver that is less focused than a driver who is not listening to loud music. Thus, the electronic control unit 102 may more readily take action by issuing a control signal when a driver is listening to loud music than when a driver is not listening to loud music. The driver's audio programming tendencies and how they relate to driver perception may be stored within the driver profile, for example. Further, the type of audio programming may also be indicative of a driver's perception. One type of audio programming may be indicative of less driver focus than another type of audio programming. Correlations between audio volume level and type of audio programming may be determined using machine learning based on experimental data and/or individual driver data.

It is noted that the electronic control unit 102 may also be configured to generate a control signal based on the object of focus that presents information regarding the object of focus. For example the control signal may be provided to an audio system, a heads up display, or other visual display to provide additional information about the object of focus. The additional information is not limited by this disclosure. In one example, if the object of focus is a sign, more information may be provided about the sign (e.g., what businesses are located at an upcoming exit), or more information about a particular vehicle is within the environment.

It should now be understood that embodiments of the present disclosure are directed to methods and vehicles configured to detect one or more objects of focus, and take appropriate action based on the one or more objects of focus. By determining what objects the driver is focusing on, actions such as notifications and autonomous vehicle control may be provided with increased success. For example, unnecessary warnings regarding objects the driver is focused on may be avoided, and warnings regarding objects the driver should be paying attention to but is not may be provided. A driver detection system detects speech spoken by the driver. An electronic control unit receives a sound signal from the driver detection system and determines the words spoken by the driver. An object detection system detects objects in the environment. The electronic control unit compares the words spoken by the driver to attributes to of detected objects. An object having attributes that match the words spoken by the driver is selected as an object of focus. A control signal that provides a notification and/or autonomously controls the vehicle is provided based at least in part on the object of focus.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
an object detection sensor configured to output an output signal;
a sound detection sensor configure to output a sound signal; and
an electronic control unit configured to:
detect one or more objects based at least in part on the output signal of the object detection sensor;
detect speech based on the sound signal of the sound detection sensor;
determine an object of focus based at least in part on a comparison of the speech and the one or more objects; and
produce a control signal based at least in part on the object of focus.

2. The vehicle of claim 1, wherein the control signal is configured to perform at least one of produce a notification and autonomously control one or more vehicle functions of the vehicle.

3. The vehicle of claim 1, wherein:
the electronic control unit is configured to determine a risk level for the one or more objects; and
the control signal is further based on the risk level.

4. The vehicle of claim 3, wherein:
the electronic control unit is configured to determine a selected object having a risk level greater than a risk threshold; and
the control signal is produced when the object of focus is different from the selected object.

5. The vehicle of claim 1, wherein the comparison of the speech and the one or more objects comprises comparing one or more words of the speech to one or more attributes of the one or more objects.

6. The vehicle of claim 1, further comprising a gaze detection sensor configured to output a gaze signal, wherein:
the electronic control unit is configured to determine a gaze direction from the gaze signal; and
the object of focus is further based at least in part on the gaze direction.

7. The vehicle of claim 6, further comprising a seat sensor configured to output a seat signal, wherein:
the electronic control unit is configured to determine a driver seat position from the seat signal; and
the control signal is produced further based on the driver seat position.

8. The vehicle of claim 7, wherein the control signal is produced based further at least in part on a driver profile.

9. The vehicle of claim 8, further comprising an audio system configured to produce an audio signal, wherein the control signal is produced based further at least in part on one or more of an audio system volume level, a type of audio produced by the audio system, an intonation of the speech, and a type of words of the speech.

10. The vehicle of claim 1, further comprising an audio system configured to produce an audio signal, wherein the electronic control unit is configured to control the audio system such that the audio signal prompts a driver to speak.

11. The vehicle of claim 10, wherein the electronic control unit is configured to store the speech in a driver profile.

12. The vehicle of claim 10, wherein the audio signal prompts the driver to orally describe the one or more objects.

13. A vehicle comprising:
an object detection sensor configured to output an output signal;
a sound detection sensor configure to output a sound signal;
a gaze detection sensor configured to output a gaze signal;
an audio system configured to produce an audio signal; and
an electronic control unit configured to:
detect one or more objects based at least in part on the output signal of the object detection sensor;
control the audio system such that the audio signal prompts a driver to speak;
detect speech based on the sound signal of the sound detection sensor;
detect a gaze direction based on the gaze signal of the gaze detection sensor;
determine an object of focus based at least in part on a comparison of the speech and the one or more objects and on a comparison of the gaze direction and the one or more objects; and
produce a control signal based at least in part on the object of focus.

14. The vehicle of claim 13, wherein the control signal is configured to perform at least one of produce a notification and autonomously control one or more vehicle functions of the vehicle.

15. The vehicle of claim 13, wherein:
the electronic control unit is configured to determine a risk level for the one or more objects; and
the control signal is further based on the risk level.

16. The vehicle of claim 13, wherein:
the electronic control unit is configured to determine a selected object having a risk level greater than a risk threshold; and
the control signal is produced when the object of focus is different from the selected object.

17. The vehicle of claim 13, wherein the comparison of the speech and the one or more objects comprises comparing one or more words of the speech to one or more attributes of the one or more objects.

18. The vehicle of claim 17, wherein the object of focus is determined when at least one of the gaze direction is in a direction of the object of focus and one or more words of the speech correspond to the one or more attributes of the object of focus.

19. The vehicle of claim 13, wherein the electronic control unit is configured to store the speech in a driver profile within a memory module.

20. A method comprising:
detecting, using an object detection sensor, one or more objects surrounding a vehicle;
detecting speech using a sound detection sensor;
determining, by an electronic control unit, an object of focus by comparing one or more words of the speech to one or more attributes of the one or more objects; and
producing, by the electronic control unit, a control signal for the vehicle based at least in part on the object of focus.

* * * * *